United States Patent [19]
Uemura et al.

[11] Patent Number: 5,505,335
[45] Date of Patent: Apr. 9, 1996

[54] LIQUID FEED APPARATUS TO PREVENT LIQUIDS FROM MIXING AND ERROR IN FEED AMOUNT

[75] Inventors: Fumitaka Uemura; Yasuyuki Negishi; Shinji Mitome; Kazuya Hayano; Kenji Hyodo; Shiro Masai, all of Yokohama, Japan

[73] Assignee: Tatsuno Corporation, Tokyo, Japan

[21] Appl. No.: 127,524

[22] Filed: Sep. 28, 1993

[30] Foreign Application Priority Data

Oct. 1, 1992 [JP] Japan ................................ 4-286815

[51] Int. Cl.[6] .................................................. B67D 5/26
[52] U.S. Cl. .......................... 222/32; 222/77; 222/108; 222/424; 73/861
[58] Field of Search .......................... 73/223, 296, 861; 222/23, 32, 35, 71, 77, 58, 108, 109, 145.7, 318, 333, 424, 638; 141/83, 94

[56] References Cited

U.S. PATENT DOCUMENTS

| 4,513,796 | 4/1985 | Miller et al. | 222/77 |
| 4,997,012 | 3/1991 | Kuziw | 222/77 |
| 5,035,141 | 7/1991 | Baird et al. | 73/296 |
| 5,133,391 | 7/1992 | Johansson et al. | 141/94 |

FOREIGN PATENT DOCUMENTS

| 0243269 | 10/1987 | European Pat. Off. |
| 0483988 | 5/1992 | European Pat. Off. |
| 2351447 | 12/1977 | France |

*Primary Examiner*—Andres Kashnikow
*Assistant Examiner*—Philippe Derakshani

[57] ABSTRACT

A liquid feed apparatus which returns liquid to a tank by emptying a common pipe to prevent mixing of liquids. The liquid feed apparatus further does not display the amount of liquid in the feed pipe at the beginning of the liquid feed from the nozzle to prevent any error in liquid feed amount.

8 Claims, 5 Drawing Sheets

LIQUID FEED APPARATUS TO PREVENT LIQUIDS FROM MIXING AND ERROR IN FEED AMOUNT

BACKGROUND OF THE INVENTION

The present invention concernes a liquid feed apparatus for feeding liquids, for example, different kinds of fuel oils such as gasoline and light oil, and different kinds of engine oils.

There has been a liquid feed apparatus capable of feeding plural kinds of liquids only by this one apparatus, and in addition, one liquid feed nozzle and a part of a liquid feed pipe in a pump device have also been used in common to feed the plural kinds of liquids. In such a liquid feed apparatus, change-over valves are provided in the common pipe, and these change-over valves are actuated to communicate one of storage tanks of the selected kind of liquid with the common pipe by a selection signal from a liquid kind selection switch, whereby a feed channel is formed between the tank and the liquid feed pipe.

Then, the pump is normally rotated and a nozzle valve is opened to feed the desired kind of liquid from the tank containing the same through the pipe and the liquid feed nozzle to, for example, a fuel tank of a car in the case that the liquid is a fuel oil. Afterward, the liquid feed nozzle is closed and the pump is then stopped to bring the liquid feed to an end.

At the end of liquid feed, a part of a fed liquid remains in the pump and the common pipe. In consequence, when another kind of liquid is next fed, the last liquid left in the common pipe by the last liquid feed is mixed with the fed liquid at the time of the next liquid feed to inconveniently form a mixed liquid.

SUMMARY OF THE INVENTION

An object of the present invention is therefore to provide a liquid feed apparatus which can securely prevent liquids from mixing and which does not cause any error of a liquid feed amount, in the case that a liquid feed nozzle, a pump, pipes and the like are used in common to feed the plural kinds of liquids.

In order to achieve the above-mentioned object, the gist of the present invention resides in an liquid feed apparatus which comprises a plurality of liquid storage tanks, weighing means for measuring the weight of the plurality of liquid storage tanks, a common pipe connected to pipes inserted into the respective liquid storage tanks with the interposition of change-over valves, a reversible pump provided in the common pipe, a liquid feed nozzle connected to the common pipe via a hose, a control panel having a liquid feed amount display, an oil kind selection switch, a liquid feed switch and a stop switch, valve control means for receiving a signal from the oil kind selection switch to change the change-over valves so that the common pipe may be connected to the liquid storage tank of the selected liquid kind, liquid feed control means for receiving a signal from the liquid feed switch to normally rotate the reversible pump, and receiving a signal from the stop switch to reversely rotate the reversible pump and to thereby return the liquid in the common pipe to the liquid storage tank, and a liquid feed display control means for setting the liquid feed amount to zero when detecting a predetermined amount of pumped liquid from one of the tanks determined by monitoring the change of the weight of the tanks measured by the weighing means after the reception of the signal from the liquid feed switch, and outputting the subsequent feed amount corresponding to further change of the weight of the tanks as a liquid feed amount display signal to the liquid feed amount display to fix the liquid feed amount display signal on reception of a signal from the stop switch.

According to the present invention, a liquid can be returned to a tank at the time of the end of liquid feed to empty a common pipe, and therefore the last fed liquid is not mixed with another kind of liquid at the next liquid feed. Furthermore, since the amount of the liquid with which the common pipe is filled is not displayed as a liquid feed amount at the beginning of the liquid feed, any error of the liquid feed amount is not caused to prevent giving trouble to a customer.

Preferably, a vacuum breaker is provided in front of the liquid feed nozzle, and therefore even if the liquid feed nozzle having a manual valve is used, the liquid can be returned by the utilization of the vacuum breaker to securely empty the common pipe.

Preferably, the common pipe is connected to the liquid feed nozzle via a hose, so that a liquid feed operation is easy.

The common pipe is provided with an atmosphere release valve and a plurality of switching valves, and the respective switching valves, are connected to one liquid feed nozzle via hoses, so that the liquid feed is carried out after the common pipe is filled with the liquid, and hence air is not jetted out from the liquid feed nozzle any more.

As described above, according to a liquid feed apparatus of the present invention, a liquid feed nozzle, a pump, pipes and the like are used in common to feed a plurality of kinds of liquids, and after the feed of the selected liquid, this liquid remaining in the pipe can be returned to a tank to empty the pipe. Therefor the mixing of the liquids can be securely prevented. In addition, the amount of the liquid with which the pipe is filled is not displayed as the amount of the fed liquid at the time of the start of the liquid feed, and thus any error of the liquid amount is not caused, so that it does not occur that the actual amount of the fed liquid is less than the displayed amount of the liquid.

BRIEF DESCRIPTION OF THE DRAWINGS

Further features of the invention appear in the following description of exemplary embodiments taken in connection with the drawings. The drawings show.

DESCRIPTION OF THE PREFERRED EMBODIMENTS

Figure 1:
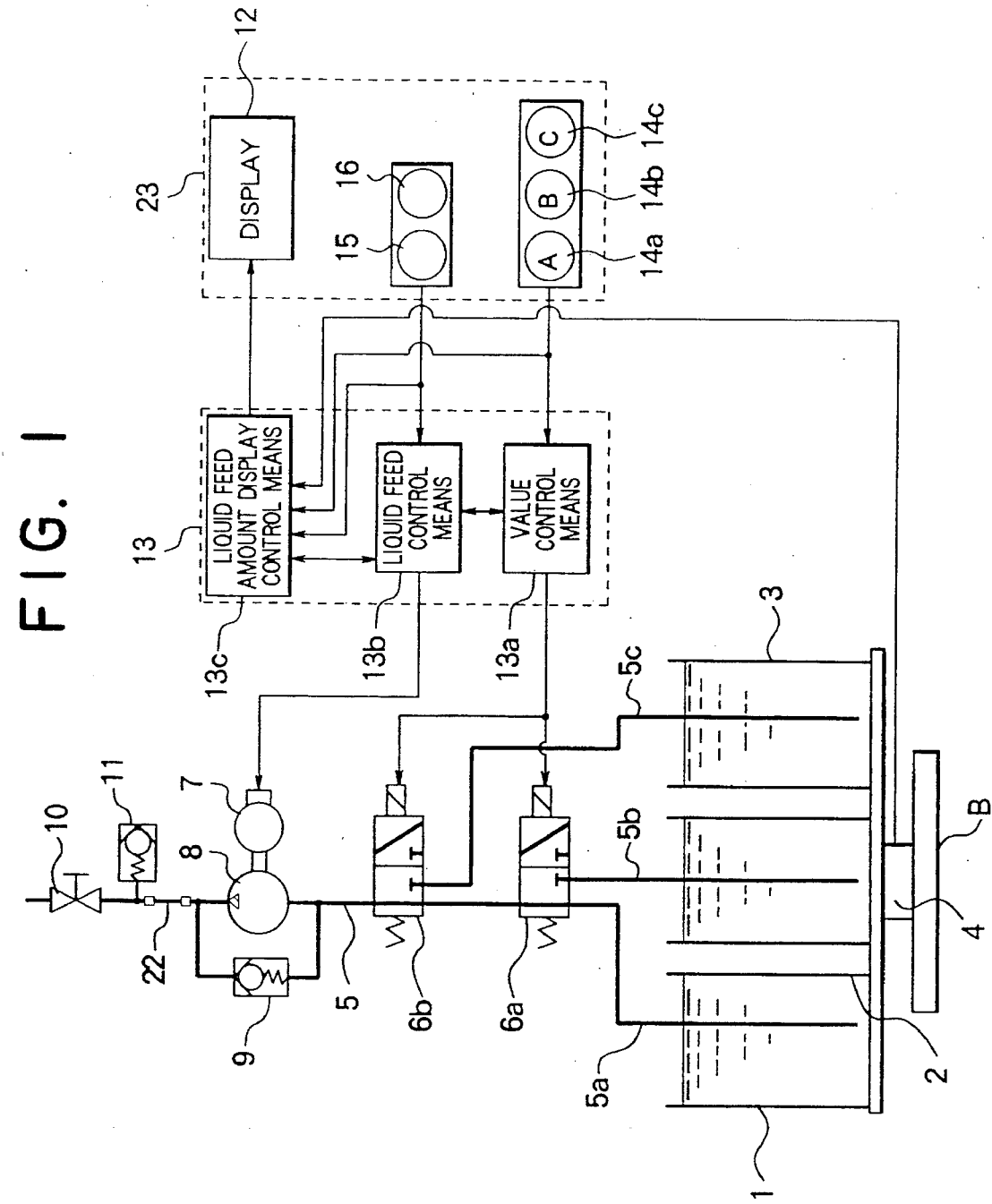
FIG. 1 is a diagrammatic view illustrating a first embodiment of a liquid feed apparatus of the present invention.

FIG. 1 is a diagrammatic view illustrating an embodiment of a liquid feed apparatus of the present invention. In this drawing, reference numerals 1, 2 and 3 are liquid storage tanks for storing different kinds of liquids, and examples of the different kinds of liquids include, for example, fuels for automobiles, such as high-octane gasoline, regular gasoline and light oil, and various kinds of engine oils. These storage tanks 1, 2 and 3 containing different kinds of liquids A, B and C are put on a load cell 4 as one weighing means. The load cell 4 is situated on a base member B.

The lower ends of pipes 5a, 5b and 5c are opened in the storage tanks 1, 2 and 3. Furthermore, the pipe 5a is connected to a common pipe 5 via change-over valves 6a and 6b, and the pipe 5b is connected to the common pipe 5 via the change-over valves 6a and 6b, and the pipe 5c is connected to the common pipe 5 via the change-over valve 6b.

In the common pipe 5, a normally/reversely rotatable pump 8 which can be driven by a motor 7 is provided, and a liquid feed nozzle 10 is connected to the common pipe 5 via a hose 22. In the drawing, reference numeral 9 is a relief valve disposed to the pump 8, and numeral 11 is a vacuum breaker disposed in the vicinity of the liquid feed nozzle 10. This vacuum breaker functions as an inlet of an air flow when the liquid in the common pipe 5 is returned to the tank.

The tanks, 1, 2 and 3, the pipes 5, 5a, 5b and 5c, the pump 8 and the like are accommodated in a case (not shown), and a control panel 23 provided with a display 12 for displaying a liquid feed amount, liquid kind selection switches 14a, 14b and 14c, a liquid feed switch 15 and a stop switch 16 is attached to the front surface of the case.

In the case, a control device 13 using a microcomputer or the like is disposed, and the load cell 4, the liquid kind selection switches 14a, 14b and 14c, the liquid feed switch 15 and the stop switch 16 are connected to the input side of the control device 13. Furthermore, the change-over valves 6a, 6b, the motor 7 and the display 12 are connected to the output side of the control device 13.

The control device 13 is provided with a valve control means 13a, a liquid feed control means 13b and a liquid feed amount display control means 13c. The valve control means 13a receives a signal from the liquid kind selection switch 14a, 14b or 14c to change the change-over valves 6a and 6b so that the common pipe 5 may be connected to the liquid storage tank 1, 2 or 3 of the selected liquid, and returns the change-over valves 6a and 6b to an original state, after the liquid feed has been completed and the liquid in the common pipe 5 has been returned to the storage tank.

The liquid feed control means 13b receives a signal from the liquid feed switch 15 to normally rotate the driving motor 7 for the reversible pump 8, and receives a signal from the stop switch 16 to reversely rotate the driving motor 7 for the reversible pump 8 and to thereby return the liquid in the common pipe 5 to the tank 1, 2 or 3.

The liquid feed display control means 13c sets the liquid feed amount to zero when an amount of the pumped liquid obtained by subtracting a certain amount from a liquid amount measured by the weighing means 4 on receiving a signal from the liquid feed switch 15 ( i.e., an amount of the l i quid with which the common pipe 5 is filled) is detected, divides the subsequent subtracted amount by a specific gravity of the liquid in the concerned liquid storage tank 1, 2 or 3 to convert the subtracted amount into a liquid feed amount, outputs this liquid feed amount as a liquid feed amount display signal to the display 12, and fixes the liquid feed amount display signal at the time of the receipt of the signal from the stop switch 16.

Figure 2:
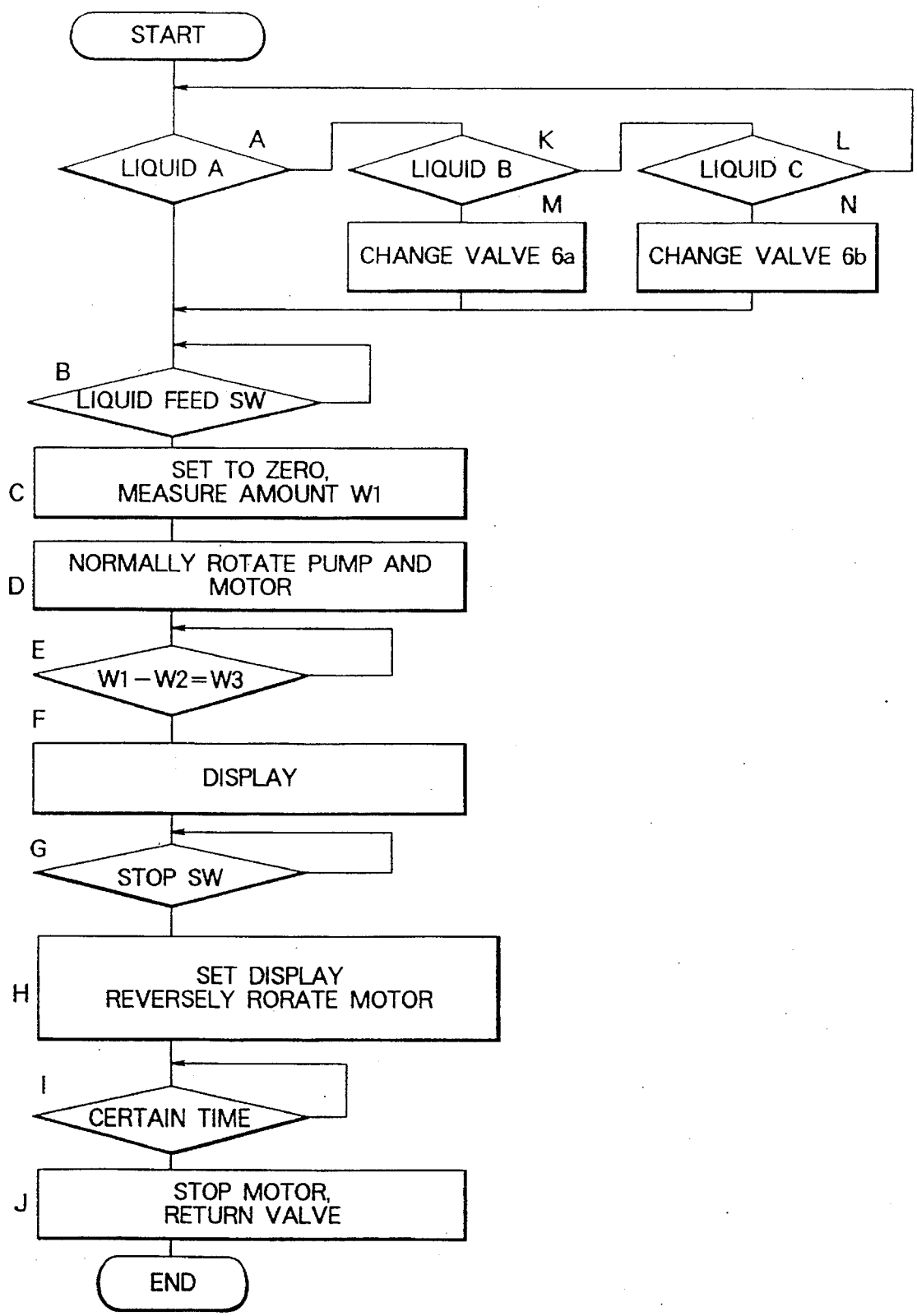
FIG. 2 is a flow chart illustrating the operation of the liquid feed apparatus of the first embodiment.

The operation of the first embodiment is now explained in reference to a flow chart in FIG. 2. The feed of the liquid, i.e. a fuel oil such as gasoline or an oil such as engine oil is carried out as follows. In the first place, the liquid kind selection switch 14a, 14b or 14c of a desired liquid (a step A, K or L), for example, a liquid A in the tank 1 is selected (the step A). As the liquid A in the tank 1 is selected and the switch 14a is depressed, a flow channel is formed between the pipes 5a, 5 and the liquid feed nozzle 10 without outputting any signal to the change-over valves 6a, 6b. Then, the liquid feed switch 15 is pushed (a step B) to reset the last liquid feed amount to zero, and an output from the load cell 4 is taken in to detect the total weight $W_1$ of the tanks 1, 2 and 3 before the start of the liquid feed (a step C).

Then, a driving signal i s input to the motor 7 to normally rotate the pump 8 (a step D). When the liquid feed nozzle 10 is manually operated so as to be opened for fuelling to, for instance, a fuel tank of an automobile, the liquid drawn up from the tank 1 by the pump 8 is forwarded to the liquid feed nozzle 10 through the empty pipes 5a, 5 and the hose 22.

During this operation, the detection of the total weight of the tanks 1 2 and 3 by the load cell 4 is continued, and if a weight $W_3$ obtained by subtracting the total weight $W_2$ after the start of the liquid feed from the total weight $W_1$ before the start reaches a predetermined amount (e.g., 500 g) beforehand set as the weight of the liquid with which the empty pipes 5a, 5 and the hose 22 are filled (a step E), it is judged that the empty pipes 5a, 5 and the hose 22 are filled with the liquid. After the empty pipes 5a, 5 and the hose 22 have been filled with the liquid in this manner, a change of the weight measured by the load cell 4 is divided by the specific gravity of the liquid A to convert the same into a liquid amount, and this liquid amount is then displayed as the liquid feed amount on the display 12 (a step F). When the feed of the liquid has been brought to an end, the nozzle valve 10 is closed and the stop switch 16 is then pushed (a step G), whereby the display of the liquid feed amount displayed on the display 12 is fixed and the motor 7 is simultaneously reversely rotated to reversely rotate the pump 8 (a step H).

As a result, the liquid A remaining in the pipes 5a, 5 and the hose 22 is returned to the tank 1, and when a certain time beforehand set as a time taken to return all of the liquid A in the pipes 5a and 5 and the hose 22 to the tank 1, for example, 5 seconds have passed (a step I) the motor 7 is stopped (a step J). If the liquid B was selected (the step K), the change-over valve 6a has been changed (a step M), or if the liquid C was selected (the step L), the change-over valve 6b has been changed (a step N). Therefore, in this step J, these change-over valves 6a and 6b are returned to the original state.

In returning the liquid in the pipes 5a, 5 and the hose 22 to the tank 1, the vacuum breaker 11 operates, whereby air is introduced into the common pipe 5. In consequence, the remaining liquid in the pipes and hose is securely returned to the tank 1, and the amount of the returned liquid is added to the stock amount of the liquid in the tank.

Figure 3:
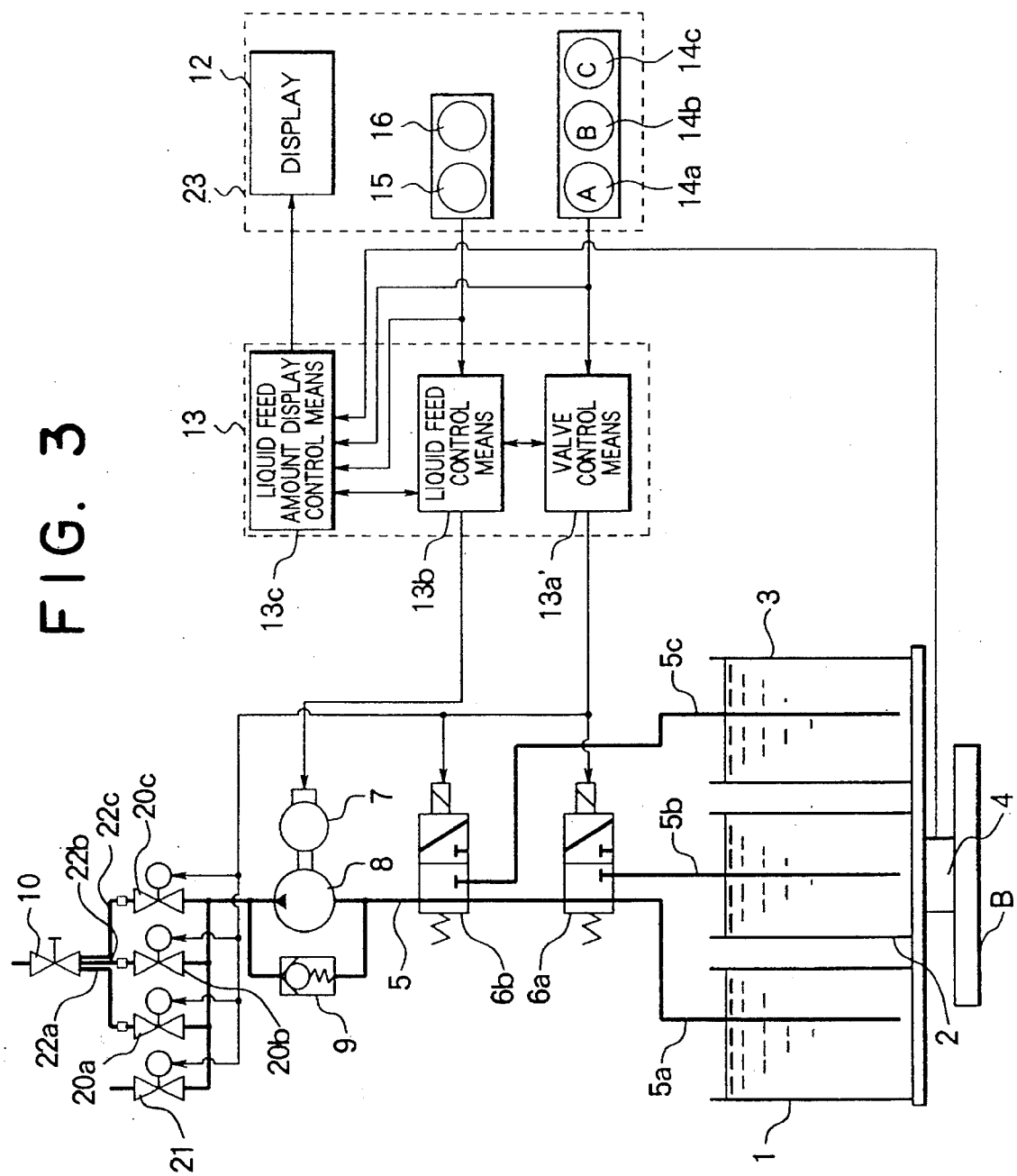
FIG. 3 is a diagrammatic view illustrating a second embodiment of the liquid feed apparatus of the present invention.

With reference to FIG. 3, the second embodiment of the liquid feed apparatus of the present invention is explained hereinafter. In FIG. 3, the same members as in FIG. 1 are represented by the same numbers, and portions of the second embodiment which are different from the first embodiment shown in FIG. 1 will be described hereinafter, but the explanation of the same portions will be omitted.

In this embodiment, the common pipe 5 is provided with a plurality of switching valves 20a, 20b and 20c and a normally opened atmosphere release valve 21, and these switching valves are connected to the nozzle 10 via the hoses 22a, 22b and 22c.

Furthermore, a valve control means 13a' of the control device 13 controls opening and closing of the switching valves 20a, 20b and 20c and the atmosphere release valve 21 in addition to the change-over valves 6a and 6b. That is, the control means 13a' receives a signal from the liquid kind selection switch 14a, 14b or 14c to change the change-over valves 6a and 6b so that the common pipe 5 may be connected to the liquid storage tank 1, 2 or 3 of the selected liquid, closes the atmosphere release valve 21 and opens the switching valve 20a, 20b or 20c of the selected liquid at a time when air in the common pie 5 is released through the atmosphere release valve 21 and the common pipe 5 is filled with the liquid, closes the previously opened switching valve 20a, 20b or 20c and opens the atmosphere release valve 21 at a time when the feed of the liquid has been terminated, and returns the change-over valves 6a and 6b to the original state after the liquid in the common pipe 5 has been returned to the liquid storage tank 1, 2 or 3.

Figure 4:
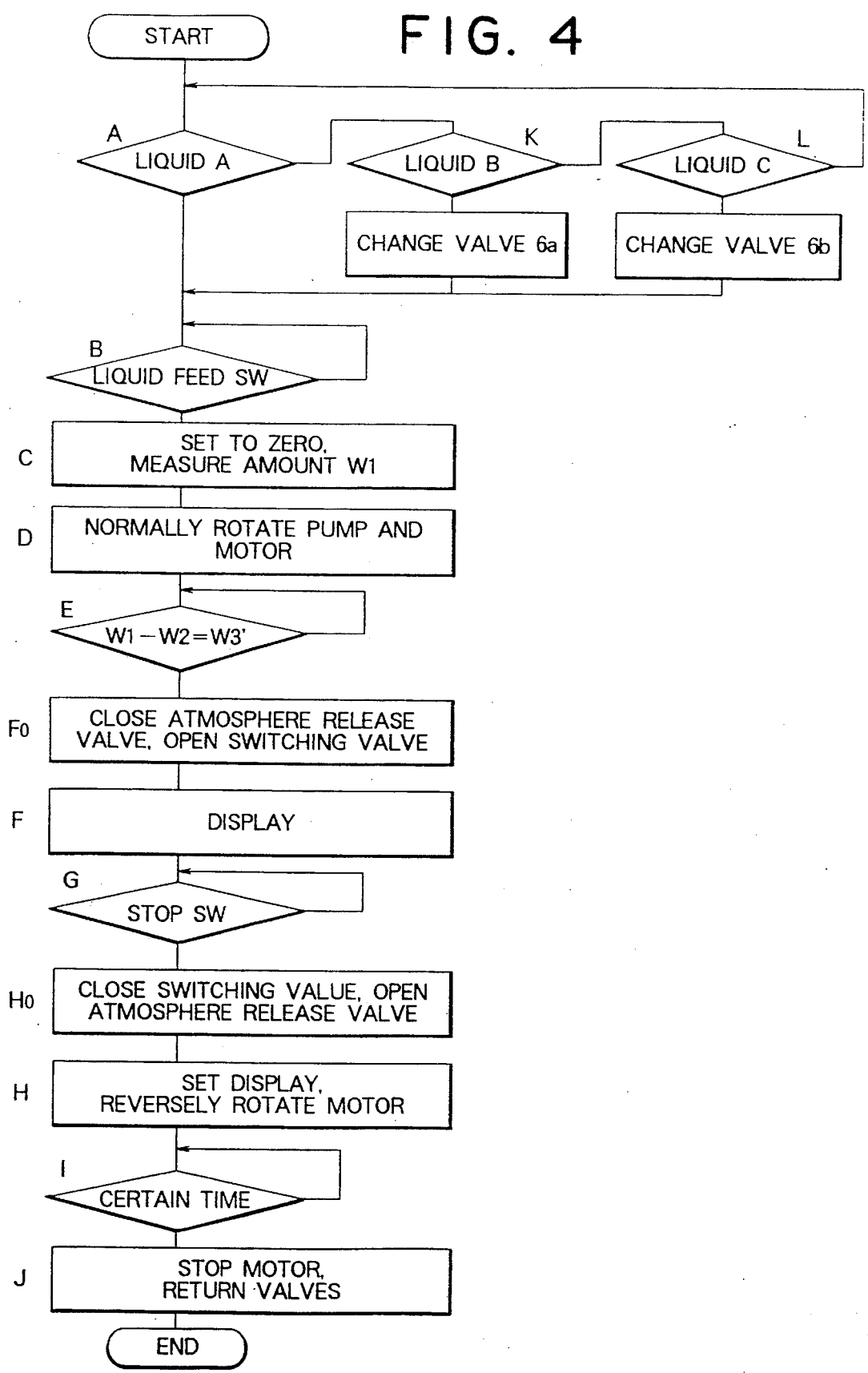
FIG. 4 is a flow chart illustrating the operation Of the liquid feed apparatus of the second embodiment.

Now reference will be made to operation of the second embodiment in reference to a flow chart in FIG. 4. The feed of the liquid, i.e. a fuel oil as gasoline or an oil such as engine oil is carried out as follows. In the first place, the liquid kind selection switch 14a, 14b or 14c of the desired liquid (a step A, K or L), for example, a liquid A in the tank 1 is selected (the step A). As the liquid A in the tank 1 is selected, a flow channel is formed between the pipe 5a and the common pipe 5 without outputting any signal to the change-over valves 6a and 6b. Then, the liquid feed switch 15 is pushed (a step B) to reset the liquid feed amount to zero, and an output from the load cell 4 is taken in to detect the total weight $W_1$ of the tanks 1, 2 and 3 before the start of the liquid feed (a step C).

Then, a driving signal is input to the motor 7 to normally rotate the pump 8 (a step D). Hence the liquid drawn up from the tank 1 by the pump 8 is forwarded to the atmosphere release valve 21 through the empty pipes 5a, 5.

During this operation, the detection of the total weight of the tanks 1, 2 and 3 by the load cell 4 is continued, and if a weight $W_3'$ obtained by subtracting the total weight $W_2$ after the start of the liquid feed from the total weight $W_1$ before the start reaches a predetermined amount (e.g., 300 g) beforehand set as the weight of the liquid with which the pipes 5a, 5 are filled (a step E), it is judged that the empty pipes 5a, 5 are filled with the liquid. As a result, the atmosphere release valve 21 is closed, and the switching valve 20a of the selected liquid A is then opened (a step Fo). When the nozzle valve 10 is manually opened, the feed of the liquid is commenced. A change of the weight measured by the load cell 4 is converted into a liquid amount, and this liquid amount is then displayed as the liquid feed amount on the display 12 (a step F). When the feed of the liquid has been brought to an end, the nozzle valve 10 is closed and the stop switch 16 is then pushed (a step G), whereby the previously opened switching valve 20a is closed and the atmosphere release valve 21 is opened (a step Ho). Simultaneously, the display of the liquid feed amount displayed on the display 12 is fixed, and the motor 7 is reversely rotated to reversely rotate the pump 8 (a step H).

As a result, the liquid A remaining in the pipes 5a, 5 is returned to the tank 1, and when a certain time beforehand set as a time taken to return all of the liquid A in the pipes 5a, 5 to the tank 1, for example, 3 seconds have passed (a step I), the motor 7 is stopped (a step J). If the liquid B was selected (the step K), the change-over valve 6a has been changed (a step M), or if the liquid C was selected (the step L), the change-over valve 6b has been changed (a step N). Therefore, in this step J, these change-over valves 6a and 6b are returned to the original state.

When the common pipe 5 is filled with the liquid and when the liquid in the common pipe 5 is returned to the tank, the atmosphere release valve 21 is opened, so that the contents of the common pipe can be smoothly replaced.

As understood from the foregoing, after the liquid in the pipe has been returned to the tank, 1, 2 or 3 to empty the pipe, all of the liquid feed operations are then brought to an end. Therefore, even if the same common pipe 5 and pump 8 are used next time to feed another liquid, the previously fed liquid is not mixed with the other liquid.

In addition, the amount of the liquid with which the empty pipes 5 and 5a, 5b or 5c is filled at the time of liquid feed start is not displayed as the amount of the fed liquid on the display 12, and therefore it can be prevented to give trouble to a customer.

Moreover, in the second embodiment, the atmosphere release valve is provided, and after the common pipe has been filled with the liquid, one of the switching valves is opened. Therefore, air is prevented from jetting from the nozzle valve 10.

Figure 5:
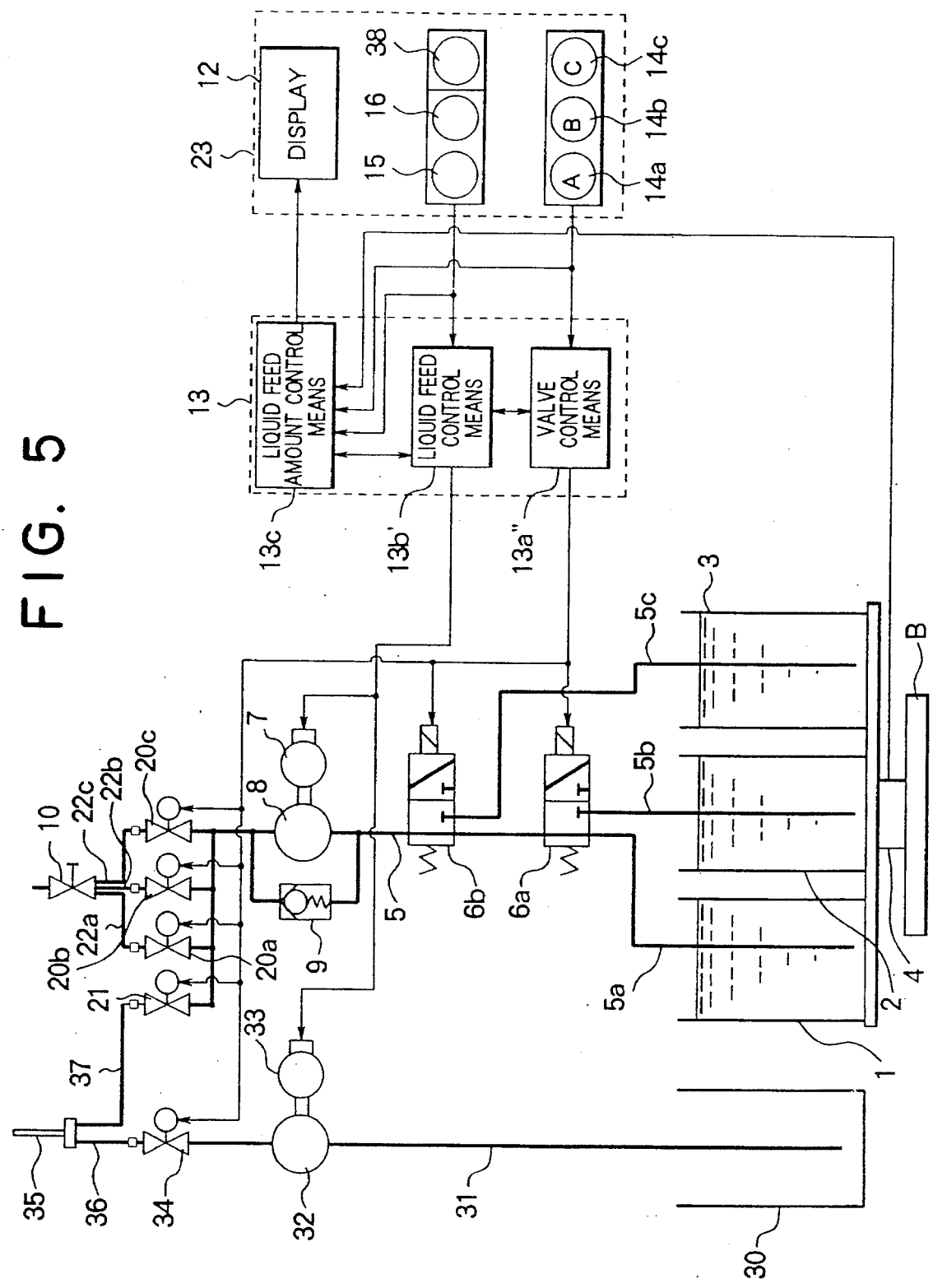
FIG. 5 is a diagrammatic view illustrating a third embodiment of a liquid feed apparatus of the present invention which is applicable also to an engine oil exchanging apparatus.

FIG. 5 shows a third embodiment of the invention which is particularly useful as an oil changer for automobile. The apparatus of the third embodiment is substantially the same as the apparatus shown in FIG. 3 except for that a waste oil discharging system is additionally provided thereto. The system includes a waste oil tank 30 into which the lower end of a discharge pipe 31 is opened, an oil scavenging pump 32 provided in the pipe 31 and driven by a motor 33, a valve 34 connected to the end of the pipe 31, and a liquid drawing/liquid feeding nozzle 35 connected to the valve 34 via a drainage hose 36 and also connected to the valve 21 via a feed hose 37. The valve 34 is controlled by the valve control means 13a". The motor 33 is connected to the liquid feed control means 13b' so that, when a liquid drawing/liquid feeding switch 38 arranged in the control panel 23 is depressed and the liquid feed switch 15 is also depressed, the liquid feed control means 13b' lets the valve control means 13a" open the valve 34 and close the valve 21 and also issues a signal for energizing the pump motor 33 and, when the stop switch 16 is depressed after completion of waste oil drainage, the control means 13b' lets the valve control means 13" a close the valve 34 and open the valve 21 and also issues a signal for deenergizing the pump motor 33.

Now in operation of the oil changer as referred to above referring to FIG. 5, first of all, the nozzle 35 is taken into an oil pan of an automobile and then the switch 38 is pressed down so that the valve control means 13a" receives a signal from the control means 13b' and issues a signal by which the valve 21 is closed and the valve 34 is opened, and then the liquid feed switch 15 is depressed so that the control means 13b' drives the pump motor 33 to let the pump 32 draw the waste oil out of the oil pan and introduce the waste oil into the oil tank 30. After completion of the drainage, the stop switch 16 is pressed down so that the control means 3lb' stops the pump motor 33 and lets the valve control means 13a" issue a signal for closing the valve 34 and another signal for opening the valve 21. Then the feeding operation of fresh oil is commenced by selecting either one of the liquid kind selection switch 14a, 14b or 14c at a customer's request. The subsequent operation is conducted like that explained by referring to FIGS. 3 and 4, but the feeding of the fresh oil is carried out through the valve 21 then opened, the feed hose 37 and the nozzle 35 then remaining taken into the oil pan. During this feeding operation, the valves 20a, 20b and 20c are kept closing so that the fresh oil from the common pipe 5 is prevented from flowing through these valves.

What is claimed is:

1. An liquid feed apparatus which comprises:

a plurality of liquid storage tanks, weighing means for measuring the weight of the plurality of liquid storage tanks, a common pipe connected to pipes inserted into the respective liquid storage tanks with the interposition of change-over valves, a reversible pump provided in the common pipe, a liquid feed nozzle connected to the common pipe via a hose, a control panel having a liquid feed amount display, liquid kind selection switches, a liquid feed switch and a stop switch, valve control means for receiving a signal from the liquid kind selection switches to change the change-over valves so that the common pipe is connected to the liquid storage tank containing the selected liquid kind, liquid feed control means for receiving a signal from the liquid feed switch to normally rotate the reversible pump, and receiving a signal from the stop switch to reversely rotate the reversible pump and to thereby return the liquid in the common pipe to the liquid storage tank, and a liquid feed display amount control means for setting the liquid feed amount to zero when detecting a predetermined amount of pumped liquid from one of the tanks determined by monitoring the change of the weight of the tanks measured by the weighing means after the reception of the signal from the liquid feed switch, and outputting the subsequent feed amount corresponding to further change of the weight of the tanks as a liquid feed amount display signal to the liquid feed amount display to fix the liquid feed amount display signal on reception of a signal from the stop switch.

2. The liquid feed apparatus according to claim 1 wherein the weighing means is a load cell carrying all of the tanks thereon and giving a signal of the existent weight of the tanks in the lump to the liquid feed amount display control means.

3. The liquid feed apparatus according to claim 1 wherein said liquid feed nozzle is provided with a manual valve, and a vacuum breaker is provided in front of the manual valve.

4. The liquid feed apparatus according to claim 1 wherein the weight signal from the weighing means is converted into an liquid feed amount on the basis of a specific gravity of the selected liquid kind, and then displayed on the liquid feed amount display.

5. The liquid feed apparatus according to claim 1 wherein said common pipe is provided with an atmosphere release valve and a plurality of switching valves, and the respective switching valves are connected to one liquid feed nozzle via hoses.

6. The liquid feed apparatus according to claim 5 which is provided with a control device for doing control so that said atmosphere release valve is closed after the common pipe is filled with the liquid by the normal rotation of the normally/reversely rotatable pump, and so that one of said switching valves is opened after the closure of the atmosphere release valve and closed by a signal from the stop switch, and so that the atmosphere release valve is opened after the closure of the opened switching valve and the liquid in the common pipe has been returned to the storage tank by the reverse rotation of the normally/reversely rotatable pump.

7. The liquid feed apparatus according to claim 1 which further comprises a discharge pipe inserted into a waste oil tank and provided with a pump therein, a drainage hose connected to the discharge pipe via a switching valve, an liquid drawing/liquid feeding nozzle connected to the drainage hose, and a feed hose connected to the liquid drawing/liquid feeding nozzle, said feed hose being connected to the common pipe via another switching valve.

8. The liquid feed apparatus according to claim 7 which further comprises a liquid drawing/liquid feeding switch which is connected through the valve control means to the switching valve provided at the end of the common pipe and to the switching valve provided at the end of the discharge pipe so that when it is depressed, the switching valve in the common pipe is closed and the switching valve in the discharge pipe is opened, and wherein a pump motor for the oil scavenging pump is connected to the liquid feed switch through the liquid feed control means so that the pump motor is energized by depressing the liquid feed switch, and wherein the pump motor is connected to the stop switch through the liquid feed control means, and the switching valve in the discharge pipe and the switching valve in the common pipe are respectively connected to the stop switch through the valve control means so that, when the stop switch is depressed, the pump motor is deenergized, the switching valve in the discharge pipe is closed, and the switching valve in the common pipe is opened, respectively, in advance of the oil feeding which is started by depressing one of the liquid kind selection switches.

* * * * *